(12) United States Patent
Sotzing et al.

(10) Patent No.: US 12,480,074 B2
(45) Date of Patent: Nov. 25, 2025

(54) NATURAL AND SYNTHETIC CANNABINOIDS AS FLUORESCENT TAGS; COMPOSITIONS, METHODS, AND APPLICATIONS

(71) Applicant: UNIVERSITY OF CONNECTICUT, Farmington, CT (US)

(72) Inventors: Gregory A. Sotzing, Storrs, CT (US); Pragati Rout, Storrs, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 0 days.

(21) Appl. No.: 18/792,976

(22) Filed: Aug. 2, 2024

(65) Prior Publication Data
US 2025/0043215 A1    Feb. 6, 2025

Related U.S. Application Data

(60) Provisional application No. 63/517,736, filed on Aug. 4, 2023.

(51) Int. Cl.
| | | |
|---|---|---|
| *C11D 3/42* | (2006.01) |
| *C07D 311/80* | (2006.01) |
| *C07D 407/12* | (2006.01) |
| *C11D 3/20* | (2006.01) |
| *C11D 3/34* | (2006.01) |

(52) U.S. Cl.
CPC .............. *C11D 3/42* (2013.01); *C07D 311/80* (2013.01); *C07D 407/12* (2013.01); *C11D 3/2096* (2013.01); *C11D 3/3454* (2013.01)

(58) Field of Classification Search
CPC .... C07D 407/12; C07D 311/82; C07D 311/80
See application file for complete search history.

(56) References Cited

U.S. PATENT DOCUMENTS

| | | |
|---|---|---|
| 8,741,317 B2 | 6/2014 | Uhrich et al. |
| 2005/0074408 A1 | 4/2005 | Makriyannis et al. |
| 2009/0036523 A1 | 2/2009 | Stinchcomb et al. |
| 2014/0329895 A1 | 11/2014 | Riggs-Sauthier et al. |
| 2015/0159082 A1 | 6/2015 | Lee et al. |
| 2015/0344618 A1 | 12/2015 | Nicholson et al. |
| 2017/0172977 A1 | 6/2017 | Kleidon et al. |
| 2018/0271827 A1 | 9/2018 | Heimark et al. |
| 2018/0272043 A1 | 9/2018 | Taylor et al. |
| 2021/0052494 A1 | 2/2021 | Flemmens |
| 2021/0322365 A1 | 10/2021 | Sotzing |
| 2024/0336833 A1 | 10/2024 | Sotzing |
| 2025/0090556 A1 | 3/2025 | Sotzing et al. |
| 2025/0122395 A1 | 4/2025 | Sotzing et al. |

FOREIGN PATENT DOCUMENTS

GB    621102 A    4/1949

OTHER PUBLICATIONS

Welling et al. (Phytochemistry 201 (2022) 113282; p. 1-15).*
(Continued)

*Primary Examiner* — Valerie Rodriguez-Garcia
(74) *Attorney, Agent, or Firm* — CANTOR COLBURN LLP

(57) ABSTRACT

Disclosed are fluorescent tags comprising a cannabinoid fluorophore and compositions comprising the fluorescent tags.

7 Claims, 8 Drawing Sheets

(56) References Cited

OTHER PUBLICATIONS

Martin-Fontecha et al. A Fluorescent Probe to Unravel Functional Features of Cannabinoid Receptor CB1 in Human Blood and Tonsil Immune System Cells, Bioconjugate Chem. (2018), 29, 2, 382-389 and Supporting Information.
Sarott et al. Development of High-Specificity Fluorescent Probes to Enable Cannabinoid Type 2 Receptor Studies in Living Cells, J. Am. Chem. Soc. (2020) 142, 40, 16953-16964 and Supporting Information.
Written Opinion for PCT/US2024/040663 dated Nov. 20, 2024.
International Search Report for PCT/US2024/040663 dated Nov. 20, 2024.
Pubchem et al., Substance Record for SID 440246656. Modify Date: Feb. 21, 2021 [retrieved on Sep. 18, 2024] Retrieved from the Internet: <URL; https://pubchem.ncbi.nlm.nih.gov/sustance/440246656>.entire document.
Borrelli, Biochemical Pharmacology, 85, 2013 (Year 2013.
Bowd et al. Photochemical Transformations of Cannabinol J.C.S. Chem Comm (1975) 797-798.
Daniels et al., "Poly(cannabinoid)s: Hemp-Derived Biocompatible Thermoplastic Polyesters with Inherent Antioxidant Properties", ACS Applied Materials & Interfaces, Nov. 21, 2022.
Delong, Drug Alcohol Depend, 112, 1-2, 2010 (Year 2010), Author Manuscript.
Harris, European Polymer Journal, 120, 2019 (Year 2019).
Malone, BJP, 162,2011 (Year 2011).
Martin-Fontecha et al. A Fluorescent Probe to Unravel Functional Features of Cannabinoid Receptor CB1 in Human Blood and Tonsil Immune System Cells Bioconjugate Chem. (2018), 29, 2, 382-389.
Morales, Paula et al.; "An Overview on Medicinal Chemistry of Synthetic and Natural Derivatives of Cannabidiol"; Frontiers in Pharmacology, V. 8, Article 422, Jun. 2017, p. 1-18.
Sarott et al. Development of High-Specificity Fluorescent Probes to Enable Cannabinoid Type 2 Receptor Studies in Living Cells, J. Am. Chem. Soc. (2020) 142, 40, 16953-16964.
Sotzing, UCONN Research—Composite Materials Including Polycannabinoids; Published online Nov. 30, 2023, 2 pages; accessed Apr. 5, 2024.
Sotzing, UCONN Research—Natural and Synthetic Cannabinoids as Fluorescent Drugs; Composition, Methods, and Application; Published online Nov. 30, 2023, 2 pages; accessed Apr. 5, 2024.
Wang et al. "Poly(Glycerol Sebacate) in Tissue Engineering and Regenerative Medicine", Material Matters, 2016, 11.3; 13 pages.
U.S. Appl. No. 19/183,058, filed Apr. 18, 2025; Inventors Gregory A. Sotzing, Pragati Rout, Lakshmi S. Nair, and Erick Orozco; Applicant University of Connecticut; Title Coadministration of Polycannabinoid With Amine/Amide Anesthetics To Enhance Efficacy Against Pain.
Weiner et al. "Monomers and polymers of delta1(6)-tetrahydrocannabinol and cannabidiol" European Journal of Medicinal Chemistry vol. 10, No. 1, 79-83, 1975.

* cited by examiner

Polybutylene adipate terephthalate

Fluorescent Polybutylene adipate terephthalate

NATURAL AND SYNTHETIC CANNABINOIDS AS FLUORESCENT TAGS; COMPOSITIONS, METHODS, AND APPLICATIONS

CROSS-REFERENCE TO RELATED APPLICATIONS

This application claims priority to U.S. Provisional Application No. 63/517,736, filed on Aug. 4, 2023, the entire contents of which are incorporated herein in their entirety for all purposes.

BACKGROUND

There are many uses for materials that exhibit optical effects. For example, thermochromic compositions are useful in signage that changes as a function of temperature. Photochromic compositions have proven to be very popular in eyewear, window treatments, and for other uses. There are a myriad of uses in electronics, the medical industry, and other segments of the economy. Unfortunately, known compositions do not extend to the variety of use scenarios possible.

Thus, what are needed are new materials that exhibit optical properties. Of course, the materials must be inexpensive to produce and use.

SUMMARY

Disclosed herein are fluorescent tags comprising a cannabinoid fluorophore and compositions thereof. Generally, the compositions provide materials with useful optical properties. The compositions enable a variety of technologies.

In an embodiment, a fluorescent tag comprises a cannabinoid fluorophore.

In another embodiment, a fluorescent tag has the structure of Formula (I) $(FC)_n$-$L^1$-$X^1$, wherein FC is a cannabinoid fluorophore moiety; n is 1, 2, or 3; $L^1$ is a linking group; and $X^1$ is a hydrogen or a functional group.

In another embodiment, a compound having the structure of Formula (II) $FC^1$-$L^1$-$FC^2$, wherein $FC^1$ and $FC^2$ are each individually a cannabinoid fluorophore moiety; and $L^1$ is a linking group.

In yet another embodiment, a fabric care composition comprises a compound having the structure of Formula (II) $FC^1$-$L^1$-$FC^2$, wherein $FC^1$ and $FC^2$ are each individually a cannabinoid fluorophore moiety; and $L^1$ is a linking group; wherein the fabric care composition is a detergent, a soap, or a fabric softener.

BRIEF DESCRIPTION OF THE DRAWINGS

The features and advantages of the invention are apparent from the following description taken in conjunction with the accompanying drawings in which.

DETAILED DESCRIPTION

Figure 1:
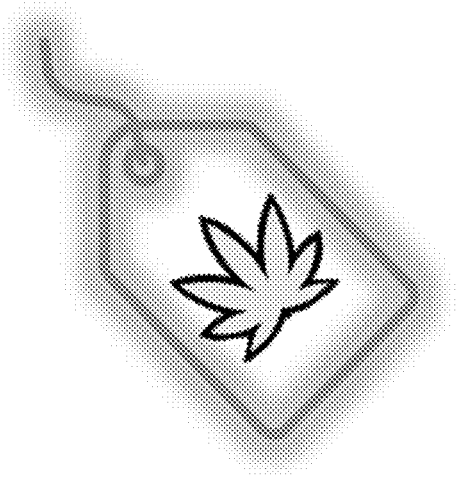
FIG. 1 is an abstraction depicting fluorescent cannabinoids.

Disclosed herein are cannabinoid fluorophores and applications for making use thereof. Exemplary applications include biomedical, medical, pharmaceutical, textile dyeing, optical brighteners in detergents, soaps, cosmetics, and clothing. Fluorophores used in electronic devices such as organic light-emitting diodes (OLED), solar cells, solar panels among many others.

These new cannabinoid fluorophores can be used alone or along with other small molecules in several applications.

Both cannabidiol (CBD) and cannabigerol (CBG) were found lacking in fluorescence. Hence, it is not known to those in the art that tetrahydrocannabinol (THC) and cannabinol (CBN) would be fluorescent. In fact, the fluorescence is tied to molecular structure as characterized by $^1$H NMR. Phytocannabinoids THC and CBN, are fluorescent, with excitation at 365 nanometer (nm). When fluorescent, the CBN phenolic OH becomes broad meaning that it is in some way connected to the fluorescence of the molecule.

In an embodiment, a fluorescent tag comprises a cannabinoid fluorophore. The cannabinoid fluorophore can be a fluorescent phytocannabinoid such as CBN, THC, Cannabifuran, or a derivative thereof. Exemplary cannabinoid fluorophores include THC, functionalized THC, a THC-R, D8-THC, D8-THC-R, D9-THC, D9-THC-R, cannabinol (CBN), functionalized CBN, CBN-R, cannabifuran (CBF), functionalized CBF, or CBF-R wherein R is a $C_1$-$C_{10}$ alkyl optionally substituted with one or more heteroatoms, a heterocycloalkyl group, or a heteroaryl group. As used herein, the cannabinoids with the "-R" suffix have the R group as a sidechain attached to the aromatic ring similar to the pentyl sidechain in phytocannabinoids THC and CBN. In an embodiment, R is a $C_1$-$C_{10}$ alkyl substituted with a hydroxyl, carboxyl, amino, sulfonate, phosphate, quaternary ammonium group, or a salt thereof. Functionalized CBN, functionalized THC, and functionalized CBF comprise a hydroxyl, carboxyl, amino, sulfonic, phosphate, or quaternary ammonium group e.g. on the pentyl moiety or on a phenyl moiety.

In a further embodiment, the fluorescent tag comprising a cannabinoid fluorophore can have the structure of Formula (I) $(FC)_n$-$L^1$-$X^1$ wherein FC is a cannabinoid fluorophore moiety; n is 1, 2, or 3; $L^1$ is a linking group; and $X^1$ is a hydrogen or a functional group.

The $L^1$ linking group of Formula (I) can be a $C_1$-$C_{40}$ alkyl group, specifically $C_1$-$C_{30}$ alkyl group, more specifically a $C_2$-$C_{18}$ alkyl group, yet more specifically a $C_3$-$C_{10}$ alkyl group; an ethylene glycol group (—OCH$_2$CH$_2$—), specifically an ethylene glycol group having 1-20 ethylene glycol residues; a propylene glycol group, specifically a propylene glycol group having 1-20 propylene glycol residues; an aryl group; a heteroaryl group; or a heterocyclic group; and further wherein $L^1$ is attached to each of FC and $X^1$ independently through an amine, an ether, a thioether, an ester, or an amido group. In an embodiment, $L^1$ linking group of Formula (I) can be an internally substituted $C_2$-$C_{40}$ alkyl group, specifically $C_2$-$C_{30}$ alkyl group, more specifically a $C_2$-$C_{18}$ alkyl group, yet more specifically a $C_3$-$C_{10}$ alkyl group containing 1, 2, or 3 heteroatoms within the carbon chain itself (not at a terminus) wherein the heteroatom is O, S, N, or a combination thereof. For example, the linking group can be an internally substituted $C_4$ alkyl group having a single O or N within the carbon chain, such as —CH$_2$CH$_2$OCH$_2$CH$_2$— and —CH$_2$CH$_2$NHCH$_2$CH$_2$—. In a further example, the linking group can be an internally substituted $C_4$ alkyl group having 2 or 3 O, S, or N within the carbon chain, such as —CH$_2$CH$_2$O(C═O)CH$_2$CH$_2$—, —CH$_2$CH$_2$(C═O)NHCH$_2$CH$_2$—, and —CH$_2$CH$_2$NH(C═O)NHCH$_2$CH$_2$—.

The $X^1$ functional group can be OH, NH$_2$, SH, —(C═O)OH, —(C═O)NH$_2$, a drug, a cannabinoid, a sulfonate, a phosphate, or a salt thereof.

The $X^1$ functional group can be a cannabinoid. Exemplary cannabinoids include a THC, functionalized THC, a THC-R, D8-THC, D8-THC-R, D9-THC, D9-THC-R, CBN, functionalized CBN, CBN-R, CBF, functionalized CBF, CBF-R, CBC, CBC-R, CBD, CBD-R, CBG, CBG-R, CBND, CBND-R, DHCBD, or DHCBD-R, wherein R is a $C_1$-$C_{10}$ alkyl optionally substituted with one or more heteroatoms, a heterocycloalkyl group, or a heteroaryl group. Functionalized CBN and functionalized THC comprise a hydroxyl, carboxyl, amino, sulfonic, phosphate, or quaternary ammonium group e.g. on the pentyl moiety or on a phenyl moiety. In a further embodiment, the $X^1$ functional group is a cannabinoid fluorophore which can be the same as or different from the FC(s) group.

| Cannabinoid Abbreviation | Cannabinoid |
| --- | --- |
| CBC | cannabichromene |
| CBC-R | substituted cannabichromene |
| CBD | cannabidiol |
| CBD-R | substituted cannabidiol |
| CBG | cannabigerol |
| CBG-R | substituted cannabigerol |
| CBN | cannabinol |
| DHCBD | dihydrocannabidiol |
| DHCBD-R | substituted dihydrocannabidiol |
| CBND | cannabinodiol |
| CBND-R | substituted cannabinodiol |
| THC | tetrahydrocannabinol |
| THCA | Tetrahydrocannabinolic acid |
| CBF | cannabifuran |
| CBF-R | substituted cannabifuran |

The $X^1$ functional group can be a drug. Exemplary drugs can be an analgesic, antibiotic, anticancer, anticoagulant, antidepressant, antidiabetic, antiepileptic, antifungal, antiinflammatory, antimicrobial, antimigraine, antipsychotic, anti- seizure, antiviral, anxiolytic, chemotherapeutic, mood stabilizer, psychotropic, sedative, steroid, or stimulant.

In an embodiment, the fluorescent tag comprising a cannabinoid fluorophore can have the structure of Formula (II) $FC^1$-$L^1$-$FC^2$ wherein $FC^1$ and $FC^2$ are each individually a cannabinoid fluorophore moiety as described herein; and $L'$ is a linking group.

The $L^1$ linking group can have the same definition as for the $L^1$ of Formula (I) and can be attached to each of $FC^1$ and $FC^2$ independently through an amine, an ether, a thioether, an ester, or an amido group.

In another embodiment $L^1$ linking group is a $C_1$-$C_{18}$ alkyl group, specifically $C_1$-$C_{10}$ alkyl group, more specifically a $C_2$-$C_8$ alkyl group, and yet more specifically a $C_3$-$C_6$ alkyl group attached to each of $FC^1$ and $FC^2$ independently through an amine, an ether, an ester, or an amido group. In a further embodiment, $L^1$ linking group is attached to each of $FC^1$ and $FC^2$ independently through an ether or an ester group, specifically an ether group.

In an embodiment, a fluorescent tagged oligomer or polymer comprises a cannabinoid fluorophore, specifically a cannabinoid fluorophore as an end cap. The oligomer or polymer may be any suitable polymer which can be end-capped or functionalized on its terminal end with a cannabinoid fluorophore. Such oligomers and polymers include a polyester oligomer, a polyester, a polyamide, a polyether oligomer, a polyether, a polyurethane, a polylactide, a polyglycolide, a poly(lactide-co-glycolide), a polylactic acid, a pol (glycolic acid, a poly(lactic acid-co-glycolic acid), a polycaprolactone, a polycarbonate, and the like. In an embodiment, the oligomer or polymer comprises units of a cannabinoid different from the cannabinoid fluorophore.

As used herein, an oligomer is a molecule having 2 to 10 repeat units.

In an embodiment, the cannabinoid fluorophore is not dexanabinol.

As described herein, the fluorescent tag comprising a cannabinoid fluorophore can be covalently attached to a compound to be traced, whether as a molecule, oligomer, or polymer. Alternatively, the fluorescent tag comprising a cannabinoid fluorophore as described herein, e.g., Formula (I) or (II), can be mixed with a material, for example as a composition comprising the fluorescent tag and a molecule, oligomer, or polymer. Such compositions are nonlimiting and can be formulated for a particular use, for example, an adhesive, a cosmetic, a detergent, a soap, a fabric softener, a paint, a pharmaceutical composition, pharmaceutical or biomedical imaging agent, etc.

Biomedical imaging: Using the cannabinoid fluorophores as a flow tracer to track, trace, and analyze flow or transportation in liquid. Coupled with enzymes they can be used as an indicator. The cannabinoid fluorophore can be covalently bonded to other molecules, oligomers, and polymers to be used as a fluorescent tag which can adhere to biomolecules. As certain cannabinoids are central nervous system (CNS) active, such as CBN and THC (d8 and d9 demonstrated) and there are many endocannabinoid receptors present all in the body, these fluorophores can naturally bind to these receptors and can easily be traced. Also, besides humans, cannabinoid receptors can be traced in animals which will help in veterinary application, biological studies and plant science.

Medical application: The fluorescent nature of these cannabinoids can be utilized in several analytical techniques such as fluorescent imaging, spectroscopy to understand the properties of different inorganic and organic molecules, and in biomedical applications. Biomedical applications can range broadly from biochemistry, immunofluorescence, protein studies, small molecule sensors, and bioimaging. Thus, instead of using modified compounds to bind and study the endocannabinoid system related research the cannabinoid fluorophores which are plant based can be used directly. In general, these cannabinoid derivatives can be used for fluorescence imaging and fluorescence-guided surgery. These fluorescent cannabinoids depict emittance spectra at different wavelengths, and this property can be utilized to distinguish among themselves based on observation test and in turn adulteration can be avoided. Furthermore, other functional groups can be substituted on these cannabinoids which can enhance their solubility in desired solvent and allow bonding to other desired functional groups on the substrate.

There are some marketed pharmaceutical drugs that are naturally fluorescent and can be transported into cells, including anthracyclines, mepacrine, obatoclax, topotecan, doxorubicin, paclitaxel, and bleomycin which have antibiotic, antiprotozoal, or anticancer properties. Due to their property of fluoresce they can be used to trace inside the body. However, due to their complex structures all of them cannot pass the blood brain barrier, or even if some of them do, they have very limited capacity to penetrate. The cannabinoid fluorophores are naturally psychoactive and naturally fluorescent making them an attractive alternative.

Also, there are very few CNS active drug for brain imaging, study and surgery. Mostly fluorescent dyes are used for this purpose, but they have side effects. But if theses dyes get replaced by cannabinoid fluorescent drugs which has very few side effects, better imaging and other tasks may be done without harming the human body.

Among the numerous fluorophores, the widely reported ones are fluorescein, rhodamine, coumarin, cyanine, and their derivatives. Also, several synthetic fluorophores are reported which have complex chemical structures and are application specific. These fluorophores usually contain a combination of aromatic groups and several pi bonds. This chemical nature helps them to absorb light energy of specific wavelength and emit light at a longer wavelength. The emission of light is usually in the visible spectra giving distinct color to the compounds. Current analytical techniques utilize the light emitting (fluorescent) properties of these molecules in various applications.

The fluorophores which are currently used in medical and pharmaceutical applications have complex chemical structures and are synthesized using tedious multistep processes. Also, some of these fluorophores use toxic metals, actinoids, lanthanoids and halogens which are harmful to the human body due to their side effects. Additionally, these fluorophores reportedly release radicals causing cell toxicity and further leading to cell apoptosis. Several fluorophores are temperature dependent and only function in certain temperature ranges. However, the instant cannabinoid fluorophores described herein are thermally stable (more than 70 degrees Celsius) and can function in a broad temperature range. In terms of biomedical imaging, there have been no known compounds which are naturally available, CNS active, and a drug and fluorescent on its own. The cannabinoid fluorophores described herein are sourced from natural resources, can be used as fluorescent tags and as fluorescent drug on its own, and can be traced inside the brain.

Phytocannabinoids THC and CBN, are fluorescent, with excitation at 365 nanometer (nm). These compounds bind to CB1 and CB2 receptors throughout the human body including the central nervous system and brain. These cannabinoid fluorophores find application in biomedical imaging of psychotropic drugs that are being considered for treatment of conditions such as epileptic seizures, dementia, post-traumatic stress disorder (PTSD), and schizophrenia.

The fluorescent tag comprising a cannabinoid fluorophore may be applied to cells ex vivo or administered to a subject by any suitable mode including parenteral (intravenous, intramuscular, intradermal, subcutaneous), oral, mucosal, topical, and the like. The fluorescent tag comprising a cannabinoid fluorophore as described herein may be combined with one or more pharmaceutically acceptable excipients suitable for the chosen mode of administration. For example, compositions for parenteral administration can include pharmaceutically acceptable and sterile emulsions, microemulsions, solutions, or suspensions. Liquid compositions may comprise, for example, water or other parenterally acceptable solvents, antioxidants, buffers, solubilizing agents, emulsifiers, or a combination thereof. Suitable vehicles and solvents include sterile water, Ringer's solution, U.S.P., and isotonic sodium chloride solution. Sterile, fixed oils can be as a solvent or suspending medium, including mono- or diglycerides, or fatty acids such as oleic acid, e.g., for the preparation of non-aqueous sterile injectables. Compositions for oral administration can be liquid or solid, comprising pharmaceutically acceptable diluents, antioxidants, buffers, and the like; and for the solid compositions, binders, lubricants, glidants, release agents, and the like. The solid oral compositions can be tablets or capsules.

The fluorescent tag comprising a cannabinoid fluorophore as described herein, including for example Formula (I) and (II) can be used for biomedical imaging with various imaging techniques including fluorescent microscopy, confocal microscopy, live cell imaging using fluorescence recovery after photobleaching (FRAP) or Förster resonance energy transfer (FRET), multiphoton microscopy, etc.

In an embodiment, a method of fluorescence imaging comprises exposing cells or a biological tissue to a fluorescent tag comprising a cannabinoid fluorophore to form a sample; exposing the sample to ultraviolet radiation or ultraviolet and visible radiation; and measuring a fluorescence emission with a fluorescence observation device. The exposing cells or a biological tissue to a fluorescent tag comprising a cannabinoid fluorophore can involve incubating the cells or biological tissue with the fluorescent tag at varying concentrations. The fluorescence observation device or fluorescence imager device can be used to measure a fluorescence emission. The exposing the sample to ultraviolet radiation can be in the wavelength range of about 100 to about 400 nm, specifically about 315 to about 400 nm (UVA), about 280 to about 315 nm (UVB), or about 100 to about 280 nm (UVC). In a further embodiment, the exposing the sample to ultraviolet and visible radiation can be in the wavelength range of about 100 to 750 nm.

Synthetic application: Commercially several fluorophores are widely used as a common ingredient in many day-to-day applications. The proposed plant-based cannabinoid fluorophores can replace them in many ways. These applications include textile dyeing, optical brighteners in detergents, cosmetics, and clothing. Fluorophores used in electronic devices such as organic light-emitting diodes (OLED), solar cells, and solar panels can be replaced by cannabinoids. Stationary applications such as pens, and highlighters which use fluorophores, and fluorescent signals and signs can be made using cannabinoid fluorophores. As a dye it can also be used as a staining agent. These fluorophores can be used in functional polymers as the active components in the polymer chain for applications involving fluorescent paints, adhesives, and other fluorescent polymer materials.

The fluorescent tag comprising a cannabinoid fluorophore can be used for authentication and anti-counterfeiting as a fluorescent tracer in a variety of materials and products including food, beverages, agricultural goods, pharmaceuticals, as well as currency. As many of the cannabinoid fluorophores are derived from natural sources, they are renewable and have low toxicity. Concentrations of the fluorescent tag comprising a cannabinoid fluorophore for use as a tracer can be very low, e.g. 0.001% to 0.1% and higher concentrations can be used.

In the detergent industry, toxic substances, such as coumarin, are commonly used as brighteners and cause skin irritation and other harmful effects. Overall, the aromatic nature of these fluorophores along with other active functionalities like metals which are responsible for the fluorescent properties adversely create toxic effects to human body. These can be replaced by plant derived fluorescent cannabinoids.

Out of several fluorophores proposed in literature and the many which are currently marketed there are only handful which are plant based. This makes the cannabinoid fluorophores unique as they can be extracted from bio-based feedstock in high yield and higher purity. The functional groups present inherently on these cannabinoids make them suitable for various chemical reactions making synthesis of their derivatives facile. These derivatives can be synthesized based on a particular and specific application. For example, the cannabinoid fluorophore, THC can be derivatized to its acid derivatives making it water soluble. Also, the distinct fluorescent colors of the cannabinoids can help in distinguishing different cannabinoids based on their emission wavelength (color). These fluorophores do not require an additional metal center or other toxic compounds which are harmful to life. Therefore, without much modification cannabinoid fluorophores exhibit a safer bio-based alternative to synthetic and toxic fluorophores currently used.

In an embodiment, phytocannabinoid CBN has a blue fluorescence close to coumarin dyes currently used as brightening agents in the detergent industry. This phytocannabinoid fluorophore can be attached via the phenolic group to polycannabinoids (antioxidants) and used in detergents or in fabric softeners that would coat fabrics and function as an optical brightener. In another embodiment, the phenolic group of the phytocannabinoid fluorophore can be replaced with an amine and attached through this group via a linking group to an additional phytocannabinoid fluorophore. The presence of the amine groups is expected to improve adhesion to fabric through hydrogen bonding and electrostatic forces while also making the resulting compound more hydrophilic, thereby improving water solubility. Extending the length of the linking group is expected to increase the number of entanglements and enhance entrapment and binding to fabrics. The fabric may be natural (e.g., cotton, linen, hemp, bamboo, wool, cashmere, silk, and the like, etc.), synthetic (e.g., acrylic, nylon, olefin, polyester, rayon, etc.), or a combination thereof.

In an embodiment, a fabric detergent composition comprises a fluorescent tag comprising a cannabinoid fluorophore as described herein, including Formula (I), (II), the oligo and polycannabinoid comprising a cannabinoid fluorophore, or a combination thereof. The detergent may further comprise a surfactant, whether anionic, cationic, nonionic, including amphoteric, or a combination of the various surfactants. The detergent composition may further comprise a carrier including water, a bleaching agent, a dye or colorant, a dye fixative, an enzyme, a binder, a perfume, a thickener, an emulsifier, an acid, a base, a salt, a chelating agent, a preservative, an opacifier, an anti-foaming agent, or a combination thereof. The detergent can be liquid or solid, including solid particulates.

In an embodiment, a fabric softener composition comprises a fluorescent tag comprising a cannabinoid fluorophore as described herein, including Formula (I), (II), the oligo and polycannabinoid comprising a cannabinoid fluorophore, or a combination thereof. The fabric softener may be in the form of a liquid fabric softener or a fabric softener sheet. The fabric softener may further comprise a softening agent such as fatty acid soap, a glycerol ester, ethoxylated fatty ester, fatty alcohol, an esterquat, etc. The fabric softener composition may further comprise a carrier, a dye or colorant, a perfume, a thickener, a preservative, or a combination thereof.

In an embodiment, a detergent, soap, or fabric softener composition can contain a fluorescent tag comprising a cannabinoid fluorophore as described herein in any effective amount, for example about 0.001 to about 5 weight percent (wt %) based on the total weight of the composition, specifically about 0.01 to about 3 wt %, more specifically about 0.02 to about 1 wt %, and yet more specifically about 0.05 to about 0.1 wt %.

In a further embodiment, the fluorescent tag comprising a cannabinoid fluorophore can be used as a stain proofing agent/stain resistant agent on fabric, textile, upholstery, etc. as an alternative to per- and polyfluoroalkyl substances (PFAS).

Example 1: Fluorescent Cannabinoids and Cannabinoid Ester Dimers (Fluorescent Tags)

The discovery of the fluorescent properties of the natural cannabinoids can serve a cheaper, purer alternative for the current fluorescent compounds and their applications. Not only that, but these different fluorescent colors of different cannabinoids can also be helpful in segregating the required cannabinoids from the mixture and can help in avoiding the adulterations. There were findings that report CBD gets converted to THC at room temperature, and now that conversion can also be monitored by the change in color just by keeping a sample under UV light without the need for sophisticated instruments like NMRs to prove conversion.

FIG. 1 depicts a molecular tag associated with fluorescent cannabinoids.

There are several chemo-drugs that act as the biocompatible fluorophores like doxorubicin, paclitaxel and bleomycin. But finding small, naturally available, CNS active drugs having fluorescent properties is a rare and a novel combination. These fluorescent cannabinoids like CBN and THC being plant derived, fluorescent and CNS active compound offers all the required characteristics for fluorescent drugs along with a sustainable impact. It can be used as fluorescent tag and a fluorescent drug on its own. Also, they can be derivatized to boost bioactivity and can be used as drug and prodrug to bring controlled and extended release to cannabinoids. In addition, these cannabinoids can have other different applications in the fluorescent world like optical brighteners in detergent, biomedical imaging, dyes, fluorescent polymers for polymer applications etc.

Figure 2:
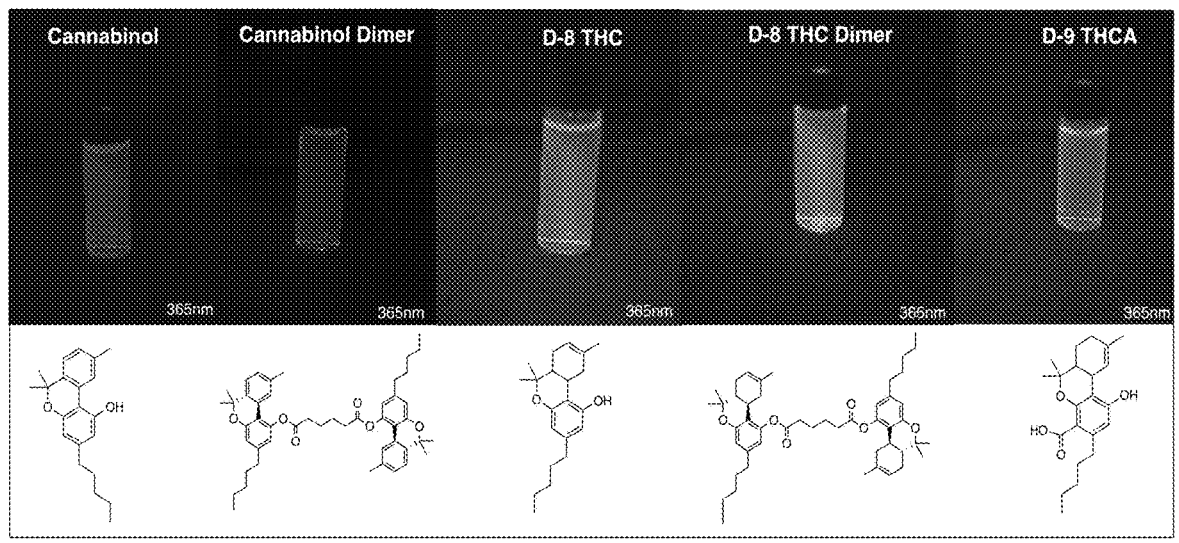
FIG. 2 is a pictorial representation of some cannabinoids showing fluorescent properties when viewed under long range UV light of 365 nm.

Tuning of these properties of the cannabinoids can be the real game changer for medical and non-medical industries. Its properties can create great impact as it is available in nature, can be cultivated with less effort and can be extracted with high purity. Some examples of cannabinoids and their derivatives having fluorescent properties are shown in FIG. 2. All these compounds can be substituted and can be studied further and thus can have broad applications. The cannabinoid drug being fluorescent, hence its diffusion into the cell can be clearly visualized due to their vivid colors under UV light. Hence, it's an optimal alternative for biomedical tracker and tracer.

FIG. 2: Pictorial representation of some cannabinoids showing fluorescent properties when viewed under long range UV light of 365 nm. Cannabinol (CBN), Cannabinol Adipate Dimer, D-8 THC, D-8 THC Adipate Dimer, and D-9 THCA were all found to have fluorescent properties. The maximum fluorescence is reported in the following table.

| Compound | Wavelength (nm) |
|---|---|
| CBN monomer | 385 |
| CBN adipate dimer | 418 |
| d-8 THC monomer | 380 |
| d-8 THC adipate dimer | 384 |

Analysis using a fluorescence spectrometer indicated that the dimers exhibited significantly enhanced fluorescence compared to their monomeric forms. Surprisingly, going from the monomer to the dimer resulted in more than an expected 2× enhancement in fluorescence as the two cannabinoid groups interacted with one another in the dimer form. Among the cannabinoids tested, the Cannabinol (CBN) adipate dimer demonstrated the most promising results over Tetrahydroxycannabinol (THC) adipate dimer.

Preparation of CBN Dimer DiCannabinol Adipate:

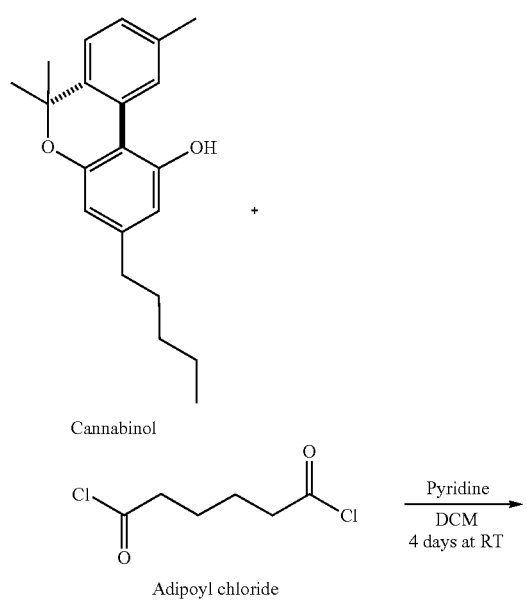

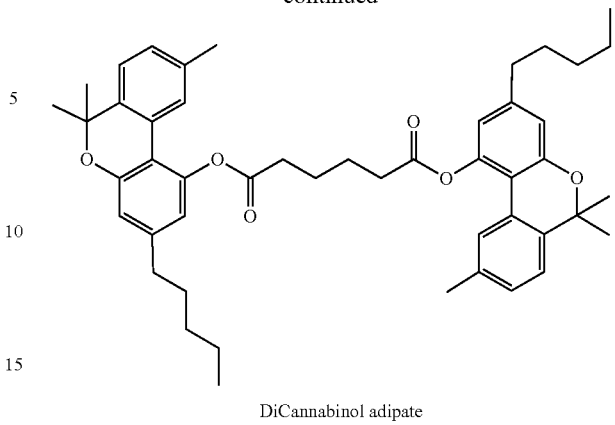

DiCannabinol adipate

CBN dimer DiCannabinol adipate was prepared by reaction of 2 equivalents of cannabinol (CBN) with 1 equivalent of Adipoyl Chloride in the presence of anhydrous pyridine and anhydrous methylene chloride (DCM) for 4 days at room temperature to obtain the solid product DiCannabinol adipate. $^1$H NMR (500 MHZ, CDCl$_3$): δ (ppm): 7.77 (d, J=1.8 Hz, 2H), 7.14 (d, J=7.9 Hz, 2H), 7.07 (dd, J=8.0, 1.8 Hz, 2H), 6.73 (d, J=1.7 Hz, 2H), 6.55 (d, J=1.7 Hz, 2H), 2.67-2.64 (m, 4H), 2.60-2.53 (m, 4H), 2.34 (s, 6H), 1.86 (p, J=3.5 Hz, 4H), 1.60 (s, 14H), 1.39-1.27 (m, 9H), 0.92-0.85 (m, 6H).

Example 2: Fluorescent Cannabinoids and Cannabinoids Dimers (a Tag Attached to a Tag)

Figure 3:
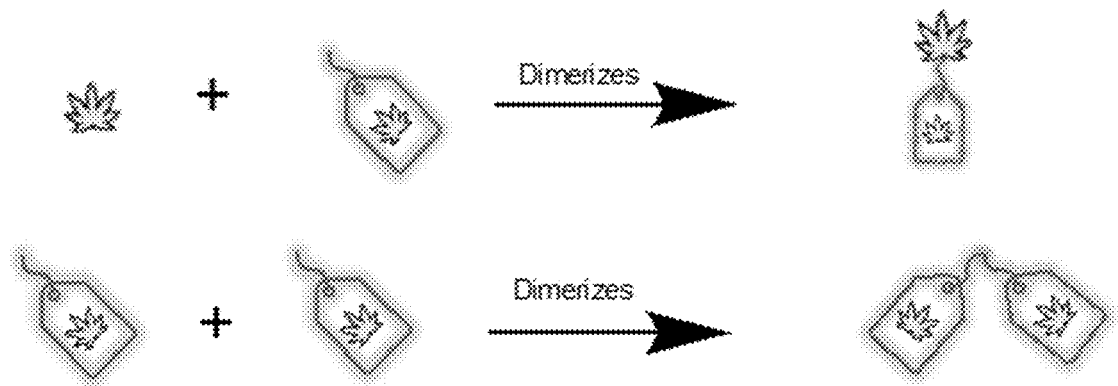
FIG. 3 is an abstraction depicting aspects of synthesis of fluorescent symmetric and
asymmetric dimers by using fluorescent cannabinoids as tags.

Medical cannabis being a product has been reported to have anti-cancer properties and being used to treat pain, specifically post-operative pain, and other medicinal properties. Current pharmaceuticals sophistication such as controlled and extended release, suffers from low bio availabilities. Non-psychotropic cannabinoids, like CBD, could offer a viable alternative to addictive and/or psychotropic pain medications like opioids. Not wishing to be bound by theory, but the fluorescence properties of certain cannabinoids is thought to be due to the structural rigidity of the three rings fused together and further due to the restricted degree of freedom. Cannabinoids are found to have a wide medical application as drug and are being used to treat multiple diseases. All cannabinoids can be made fluorescent by tagging the fluorescent cannabinoids to non-fluorescent cannabinoids and synthesizing fluorescent cannabinoid dimers and in turn used as fluorescent cannabis drugs. The free alcohol present in the fluorescent cannabinoids can be used to dimerize with other cannabinoids or the same cannabinoids as shown in FIG. 3 to form cannabinoid dimers as tag attached to a tag. Hence, these tagged compounds can be used to record the drug activity and simultaneously treat a disease.

FIG. 3 is a general schematic for the synthesis of fluorescent symmetric and asymmetric dimers by using fluorescent cannabinoids as fluorescent tags.

Example 3: Fluorescent Cannabinoids as a Tag to Other Drugs

Fluorescent tags are small organic molecules that change their fluorescence emission in response to a binding event, chemical reaction, or change in their immediate environment. They are widely used in drug discovery, cellular imaging, environmental analysis, and various medical applications. Currently proteins are used as fluorescent tags; a major disadvantage with proteins is their large size (typically ~25 kDa) which can compromise the function of co-expressed biomolecules or prevent labeled drugs from accessing their target cells.

Figure 4:
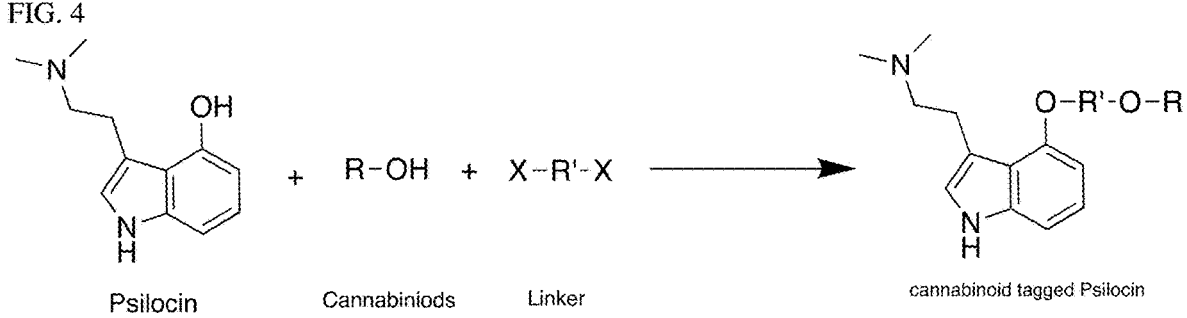
FIG. 4 depicts aspects of synthesis of cannabinoid tagged psilocin.

FIG. 4 is a general schematic for the synthesis of Cannabinoid tagged psilocin where the R is a cannabinoid, in particular a cannabinoid fluorophore; X is a reactive group such as a leaving group; and R' is a linker.

Psilocin can be replaced with other drugs. The tagged drug can be used to trace its presence inside the cell and the activity can be recorded. Use of the fluorescent cannabinoid tagged drug can replace costly, complex and toxic fluorophores.

Figure 5:
FIG. 5 is an abstraction depicting aspects of cannabinoids used as a fluorescent tag and that can be tagged with any drug.

FIG. 5 is a general schematic for cannabinoids used as a fluorescent tag which can be tagged with any type of drug.

Example 4: Amphiphilic Fluorescent Cannabinoids

The blood-brain barrier (BBB), a significant physiological barrier in the brain, alters the concentration of therapeutic medicines at target tissues therefore hindering total elimination of malignant cells. Brain cancer (BC) is a type of brain illness whose treatment is affected significantly by the BBB. To increase the bioavailability of cannabinol and other cannabinoids for pharmaceutical applications, it may be necessary to make the cannabinoids water soluble so that cannabinoids as a drug can be more efficiently delivered to the active sites. It is known that some cannabinoids are psychoactive drugs and can bind to receptors in the CNS. As fluorescent substances are key components in applications involving optical devices, cellular imaging techniques, and sensors, the cannabinoid fluorophores and their use as fluorescent tags provide new opportunity. Cannabinoids being naturally derived, and fluorescent makes them a unique option for advanced biomedical imaging application. To enhance the efficacy of cannabinoids and overcome their lipophilic nature, they can be functionalized to be water soluble.

Figure 6:
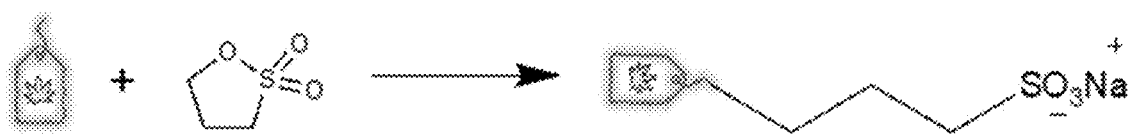
FIG. 6 is an abstraction depicting aspects of reaction of propane sultone with cannabinoids to make it aqueous soluble.
Figure 7:
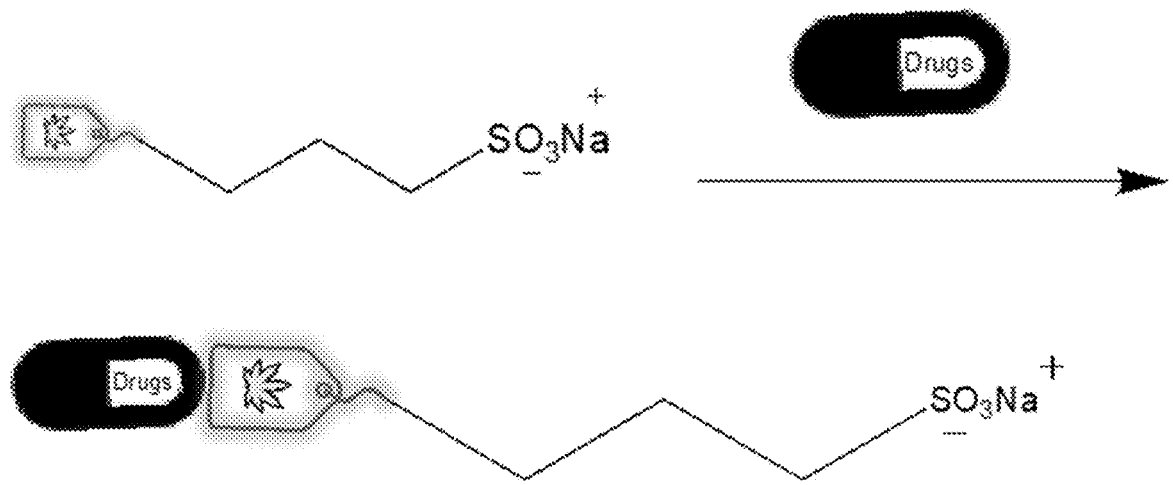
FIG. 7 is an abstraction depicting aspects of hydrophilic cannabinoids tagged to drugs.

FIG. 6 is a general schematic for reaction of propane sultone with a cannabinoid to make it aqueous soluble. The hydrophobic nature of cannabinoids can be converted to hydrophilic by substituting the cyclic sulfonate esters to cannabinoids as shown in FIG. 6. Besides propane sultone, other sulfonate compounds and phosphates can be substituted to cannabinoids. These modifications of cannabinoids can be made with the intention of increasing solubility in water and blood for biomedical imaging. These modified cannabinoids can be tagged to other drugs and hence can also be used to trace the drug activity and behavior inside the human body (FIG. 7). FIG. 7 is a general schematic for a hydrophilic cannabinoid tagged to a drug.

Example 5: Fluorescent Polycannabinoids

Figure 8:
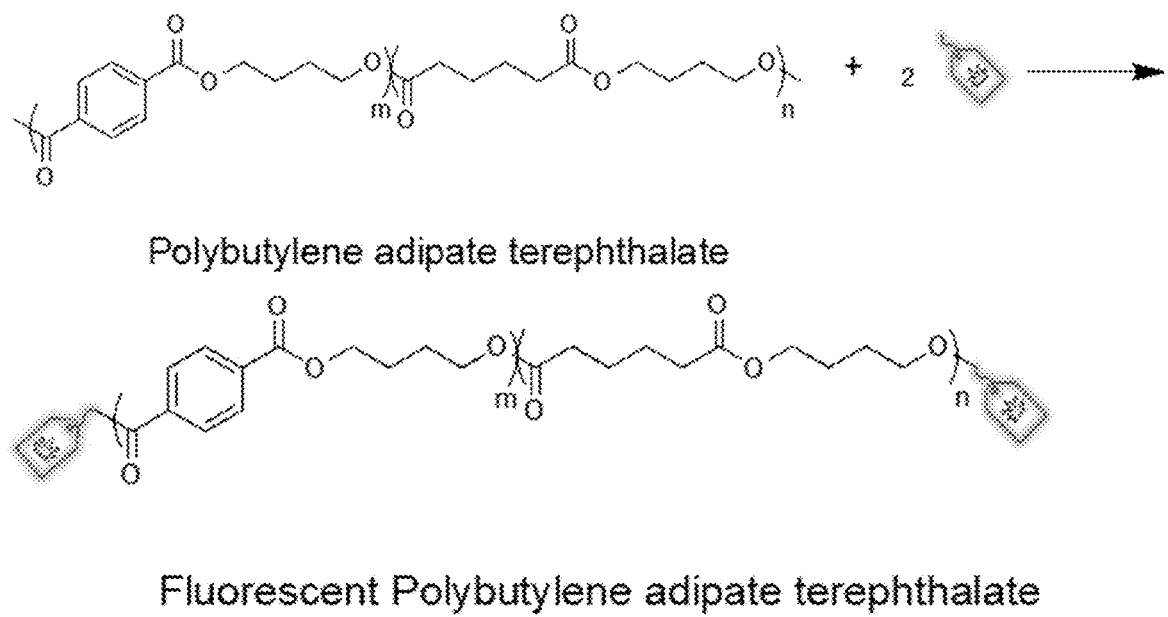
FIG. 8 is an abstraction depicting aspects of fluorescent cannabinoids end tagged to PBAT.

Some isolated cannabinoids have psychotropic effects, meaning it can travel to the brain through fluid and can cause a cataleptic effect in the human body. The brain comprises filters called the blood brain barrier which filter out toxic substances before it reaches the brain. The psychotropic effect of the cannabinoids can be modified by polymerizing the cannabinoids by addition of an additional functionalities to the cannabinoids or end capping to polymers or oligomers (FIG. 8). Apart from medical applications these fluorescent cannabinoids can also be applied to synthetic applications, for example, by using the polymer as a nanofiber to soak up psychotropic cannabinoids for colorimetric DUI determination.

FIG. 8 is a general schematic for fluorescent cannabinoids end tagged to polybutylene adipate terephthalate (PBAT).

Example 6: Drug Testing of Cannabis

Cannabis drug testing uses multiple methodologies to detect cannabis in the human body. Due to its high detectable and lipophilic nature it has a long elimination half-life and can therefore be detected using techniques like urine testing, duquenois-levine reagent, azo dyes test, Beam's CBD test, hair, saliva, blood and neurological testing. However, these techniques in the art are time consuming, and sometimes give unreliable results. Hence the lack of a suitable test to check intoxication levels remains an issue.

A unique approach to testing includes a fluorescent system device and methods for sensing the chemicals through optically absorbing and luminescence properties. Additionally, the device can also amplify the emission by incorporating with a polymer.

Another approach towards fluorescence devices includes an inexpensive and handy fluorescence imager device using PVC (polyvinylchloride) pipes. The fluorescence can be viewed through the instrument and can be captured by a camera.

The unique fluorescent nature of different cannabinoid fluorophores can be incorporated with the above mentioned techniques to build a drug testing instrument of cannabinoids for drug abusers, regardless of the administration, whether smoked, consumed as an edible, etc. As concentration is directly proportional to the intensity of fluorescence, the intoxication level can also be calculated. Furthermore, CBD converts to THC by heat, thus the composition of THC in smoke, for example, will be very high and will be very easy to detect through fluorescence by devices like a breath analyzer.

Example 7: Optical Brighteners

White cloths get easily dirty, and the dirtiness gets quite evident after frequent use. So, the need for making white cloths whiter increases with use. Optical brighteners are used to make dirty white cloths blue where the off-white color change to light grey makes the cloths look 'whiter' to the naked eye. The optical brighteners absorb the UV light and emit light in the blue region, thus giving shine to the cloths. In detergents substituted stilbene, thiophene, and similar other compounds are used as optical brighteners. However, these compounds are skin irritants and environmentally hazardous. There remains a need for a replacement of these optical brighteners.

The natural fluorescent cannabinoids emit fluorescent blue under UV light and can be a better alternative to these toxic optical brighteners. Using cannabinoids as optical brighteners, which are extracted from nature, have compact structures, and can be easily decomposed can hence promote green detergent and green fabric softeners.

Example 8: Fluorescent Dyes

Dyes which absorb and emit in the visible light are called fluorescent dyes. These dyes when applied to textile material or other materials gives rise to fluorescence under UV light and in daylight as well. There are very few organic fluorescent dyes and hence they are commercially exploited. This fluorescence generally occurs in highly conjugated molecules i.e., molecules having a greater number of alternating double bonds. Application of these dyes are not limited to textile industry but have a very diverse applications including fluorescent labeling (for example, protein and cellulosic fibers), hydrogeological tracing, thin layer chromatography (TLC) plates, imaging, and others. For the abovementioned applications the cannabis fluorescent molecule can serve the purpose.

The different fluorescent dyes also are used in making highlighter pens depending on the required color. The color on the pens gets produced by using the specific-colored dyes or by mixing color dyes and they fluoresce depending on their absorbance in UV spectrum. When the electrons in the molecule get excited to higher energy they relax back to their ground state, while they do so they release certain energy in the form of light. Hence, the dye gives the fluorescent appearance. Incorporating the cannabinoids dyes, which contain many conjugated double bonds in its structure, to the highlighter pens can prove to be a better alternative to the harmful dyes used in current highlighter pens.

Not only can light initiate fluorescence in a fluorophore molecule but also some chemical reactions can initiate fluorescent properties. Just like in glow sticks, there are two compartments, an inner glass compartment comprises of hydrogen peroxide and an outer compartment contains diphenyl oxalate. When the glass chamber breaks, the hydrogen peroxide oxidizes the diphenyl oxalate and generates an unstable product called 1,2-dioxetanedione which quickly decomposes and releases energy. That energy then used up by the fluorescent dye and its electrons gets excited and when coming back to ground state, they release energy in the form of light. Hence, in a similar fashion the different uniquely glowing cannabinoid fluorophores and substituted cannabinoid fluorophores can be used to generate light in all glowing materials as fluorescent dyes. Also, to enhance the fluorescent properties of the cannabinoids several sulfonate or phosphonate containing functional groups can be incorporated in the molecule which can cause an excitation and emission both in visible range of spectra, thus emitting brightly in differently colors.

Example 9: Fluorescent Labels

Alcohol and acid functionality in the cannabinoids provides a platform to polymerize the cannabinoids and produce fluorescent polymer and can be used as an alternative to the plastic used today. In this plastic dominant world, the sustainability objective increased the demand for the recycled materials, specifically food packaging products. How to recycle the plastic completely remains a large hurdle. Current technology can identify what the product once contained but cannot automatically sort and separate mixed plastic waste such as polyethylene terephthalate, high-density polyethylene, polypropylene, etc. Because of this, only a few plastics are delivered to recycling facilities and the remainder are sent to landfills. To overcome this issue, different fluorescent cannabinoids and fluorescent polycannabinoids can be used as a patch or label like a barcode to identify different plastics just by UV light and/or can be used as fluorescent plastics by itself.

Example 10: Fluorescent Paint

Fluorescent paint or luminous paint which exhibits visible light through different mechanisms like fluorescence, phosphorescence, or radioluminescence. Paints such as these glow when exposed to natural UV light or artificial lights, where the paint absorbs UV radiation and then emits light of a particular color. Generally fluorescent paints are of two types: visible and invisible. The visible type appears normal in daylight, but is enhanced, or 'glows' under black lights. The invisible paints are used for clever effects as it appears transparent under daylight and exhibits a completely different color under UV light. Cannabinoids or polycannabinoids having fluorescent properties is optimal for these applications. The cannabinoid fluorescent paints can be made available in different colors and can have wide application like theatrical lighting, posters, children entertainment, sign boards, etc. As the fluorescent paints are best viewed at darker places, it will be applicable for markings highways, railroads, runways, ship ports and others.

Example 11: Fluorescent Quenching

When a fluorescent molecule loses its fluorescence intensity due to certain factors it is called quenching. There are many quenchers present, some of the chemical quenchers are molecular oxygen, iodine ions, etc. Also, there are various processes such as excited state reactions, collisional quenching, energy transfer and complex formation results in quenching.

Förster resonance energy transfer (FRET) is a dynamic quenching process in which the energy is transferred from donor to acceptor non radiatively in the donor excited state. It is a type of dipole-dipole interaction which depends on donor and acceptor distance, their spectral overlap and their transition dipole movements.

In similar fashion the fluorescent cannabinoids and fluorescent polycannabinoids can be quenched using suitable quenchers and can be used for FRET-based assays, and can be used to detect target species, for example detection of DNA, protein, metal ions, and macromolecules.

In some embodiments, charge transfer complexes will quench fluorescence, and FRET as it will enhance fluorescence and cause a shift in color. Such adaptations provide, for example, for observation and understanding of a drug as it travels through the body, moves through a cell wall, and binds to a receptor site. It has been shown that CBN remains CBN for long durations as observed by NMR.

Experiments were conducted to investigate the fluorescence quenching of cannabinol 2C ether dimer (Example 12) in acetone upon mixing with different isomers of phenylenediamine: ortho-phenylenediamine, meta-phenylenediamine, and para-phenylenediamine. It was observed that the fluorescence of the cannabinol ether dimer was significantly quenched when mixed with ortho- and para-phenylenediamine, but not with meta-phenylenediamine. This quenching phenomenon can be attributed to the electronic interactions and spatial arrangements of the amino groups in the different phenylenediamine isomers. Both ortho- and para-phenylenediamine have amino groups positioned such that they can effectively engage in electron-donating and resonance interactions with the excited state of cannabinol 2C ether dimer, facilitating non-radiative relaxation pathways such as photoinduced electron transfer (PET). In contrast, meta-phenylenediamine's amino groups are positioned in a way that makes such interactions less efficient, resulting in minimal quenching.

Example 12: Synthesis of DiCannabinolalkyleneether Dimers

Initial observations indicated that ester bonds in cannabinoid dimers (see Example 1) may negatively impact the electronic properties of the aromatic ring in CBN, potentially quenching fluorescence due to their susceptibility to hydrolysis and by pulling electrons away from the CBN aromatic ring. To address this, CBN dimers with ether bonds synthesized, which offer several advantages. Ether bonds are more chemically stable than ester bonds, particularly under physiological conditions, preventing hydrolysis and structural degradation. They also preserve the electronic environment of the aromatic ring, maintaining the necessary conjugation for strong fluorescence. Furthermore, ether bonds are less prone to enzymatic cleavage, making them more suitable for biological applications where stability is desired. A series of ether-linked Cannabinol dimers with varying carbon chain lengths: 2, 3, 4, 5, and 6 carbons were synthesized. A general schematic of the synthesis is shown in Scheme 1.

Scheme 1. Synthesis of Cannabinol dimers having linker spacing of (a) 2 carbons, (b) 3 carbons, (c) 4 carbons, (d) 5 carbons and (e) 6 carbons.

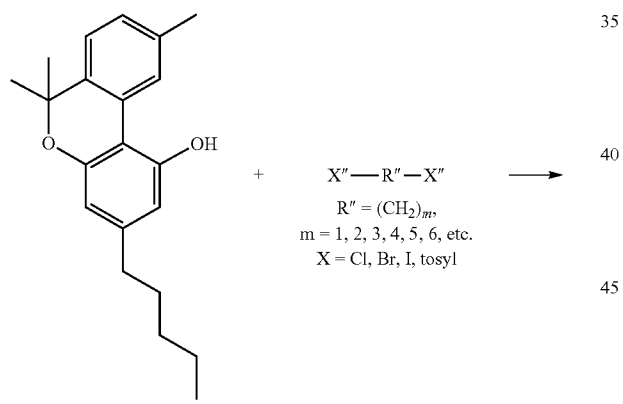

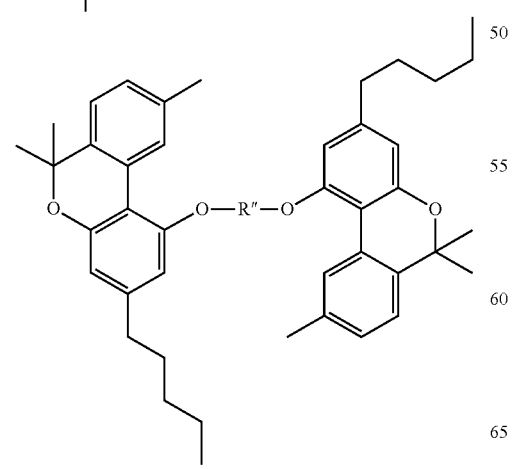

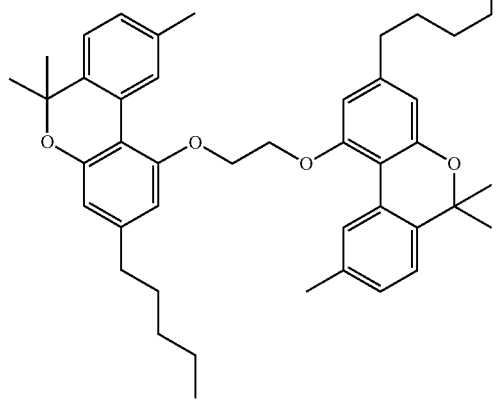

(a)

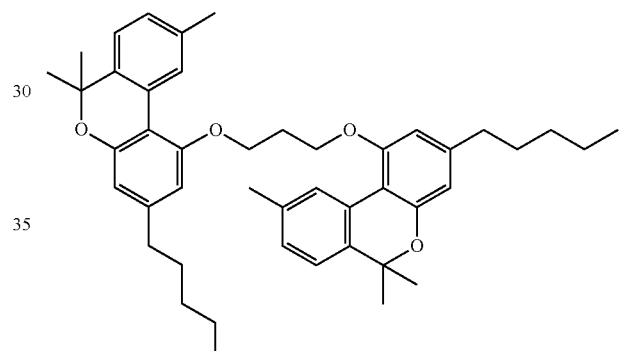

(b)

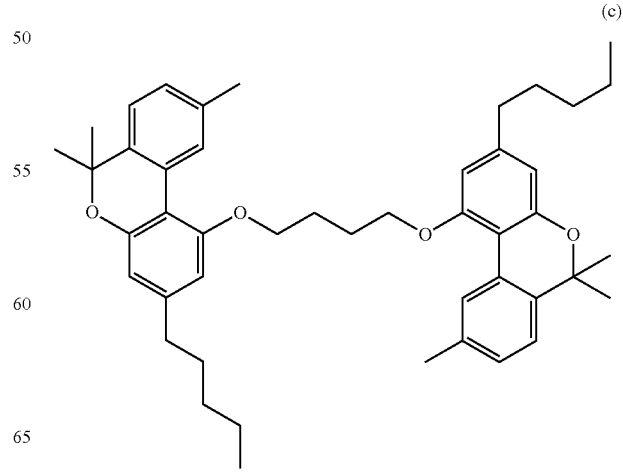

(c)

(d)

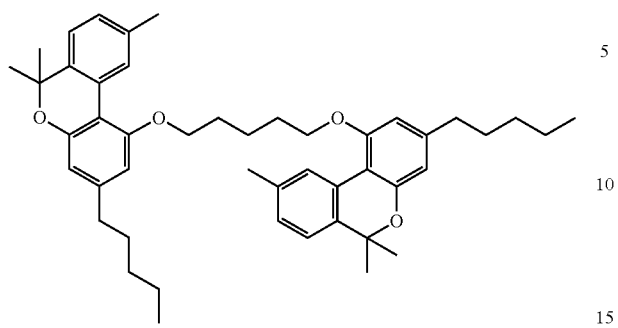

(e)

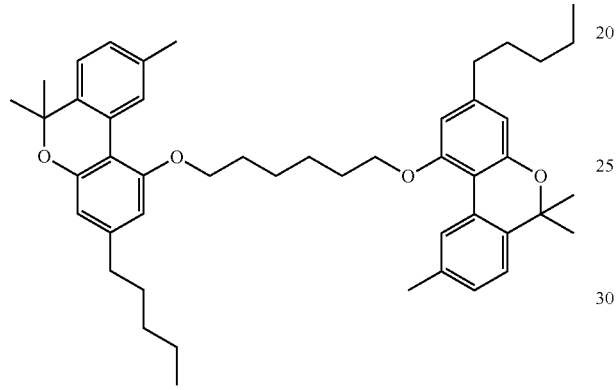

The synthesis method involved taking cannabinol and the appropriate dialkyl halide or dialkyl tosylate in a 2:1 ratio in the presence of a base and aprotic solvent. The reaction mixture was stirred overnight at 80° C. The reaction was continuously monitored using TLC (Thin layer Chromatography). Once the reaction was completed the reaction mixture was quenched with deionized water, then the layer was separated using dichloromethane (DCM). The organic layer was collected and dried using magnesium sulfate. Excess DCM was evaporated using a rotatory evaporator. Then the concentrated solution was further crystallized using methanol. The white powder obtained as product yield >80%.

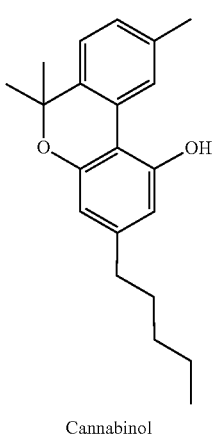

Cannabinol

+

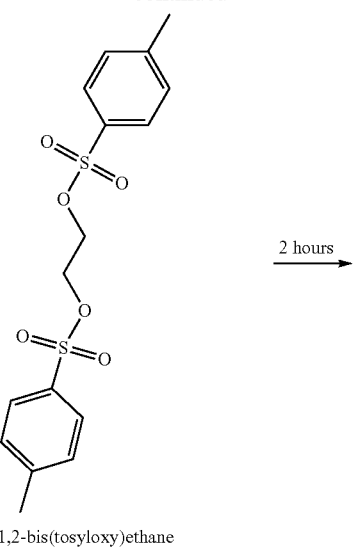

1,2-bis(tosyloxy)ethane $\xrightarrow{\text{2 hours}}$

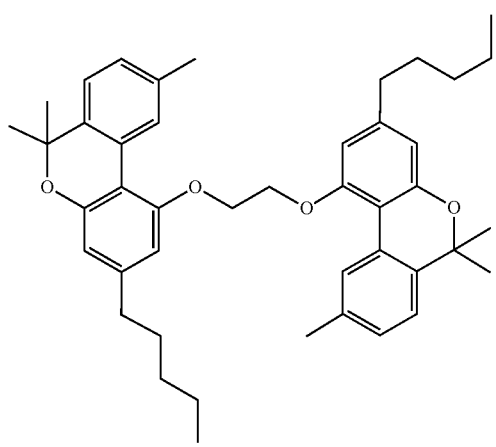

Dicannabinoethyleneether

Dicannabinolethyleneether dimer was prepared from the reaction of cannabinol and 1,2-bis(tosyloxy) ethane to form the solid product Dicannabinolethyleneether dimer. $^1$H NMR (500 MHz, CDCl$_3$): δ (ppm): 8.40 (d, J=1.8 Hz, 2H), 7.06 (d, J=7.8 Hz, 2H), 6.93 (dd, J=7.8, 1.8 Hz, 2H), 6.54-6.49 (m, 4H), 4.55 (s, 4H), 2.58 (t, J=7.7 Hz, 4H), 1.91 (s, 6H), 1.59 (s, 16H), 1.35 (dt, J=7.5, 3.7 Hz, 8H), 0.95-0.86 (m, 6H).

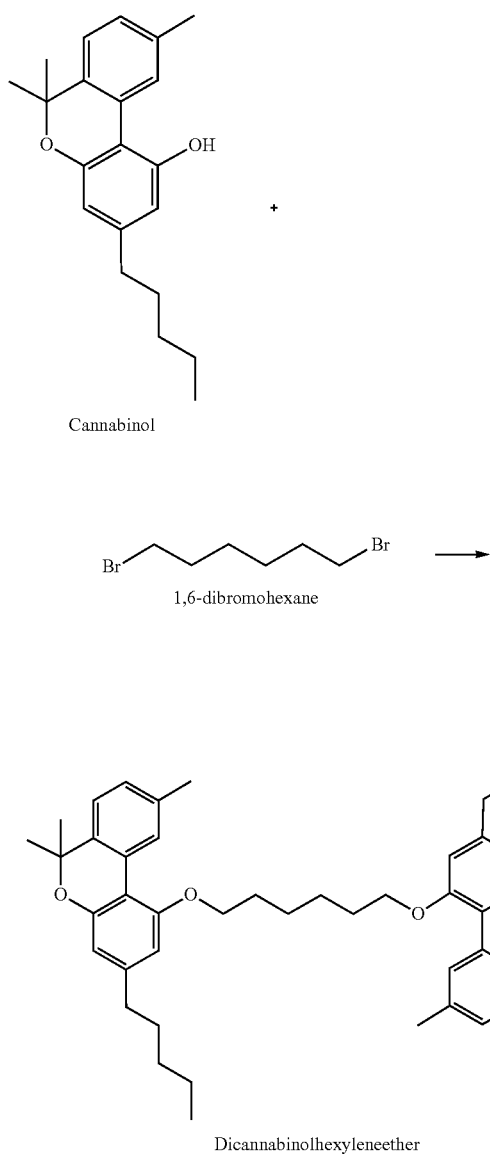

Cannabinol 1,6-dibromohexane

Dicannabinolhexyleneether

Dicannabinolhexyleneether dimer was prepared from the reaction of cannabinol and 1,6-dibromohexane to form the solid product Dicannabinolhexyleneether dimer. The product was characterized by $^1$H NMR.

Example 13: Odd-Even Effect Study of DiCannabinolalkyleneether Dimers

Figure 9:
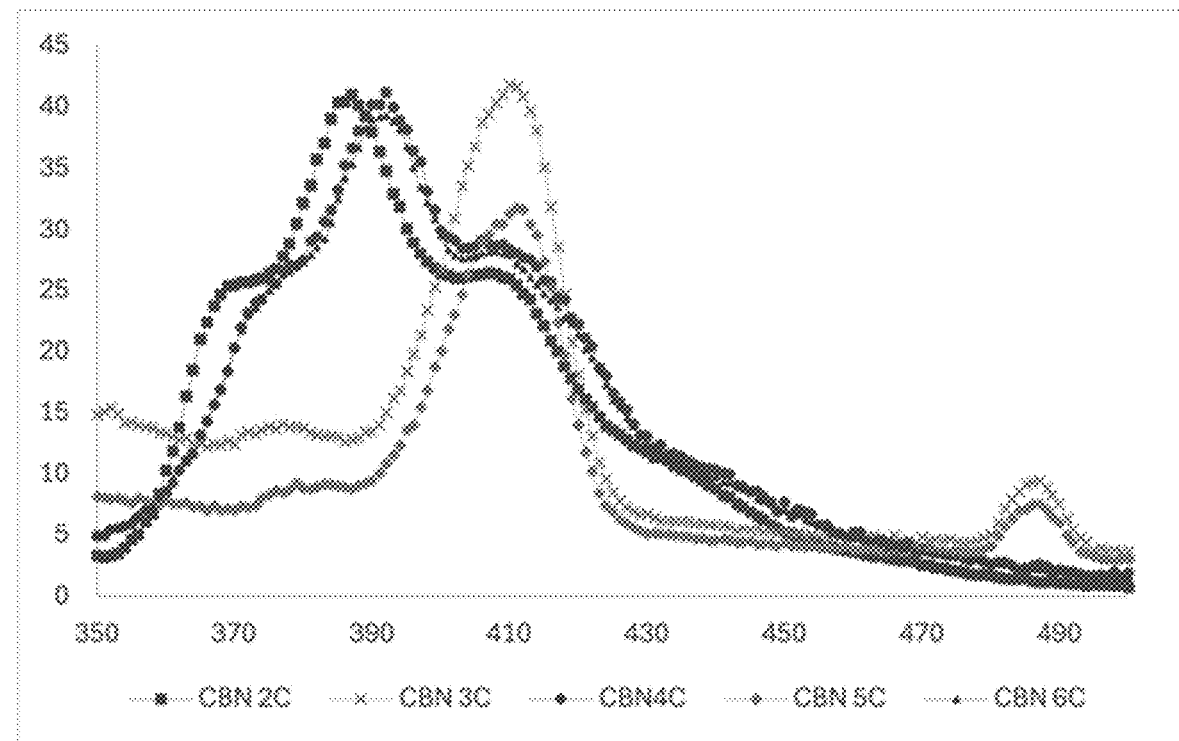
FIG. 9 Fluorescence spectra of different CBN ether dimers having linkers of varying carbon chain length.
Figure 10:
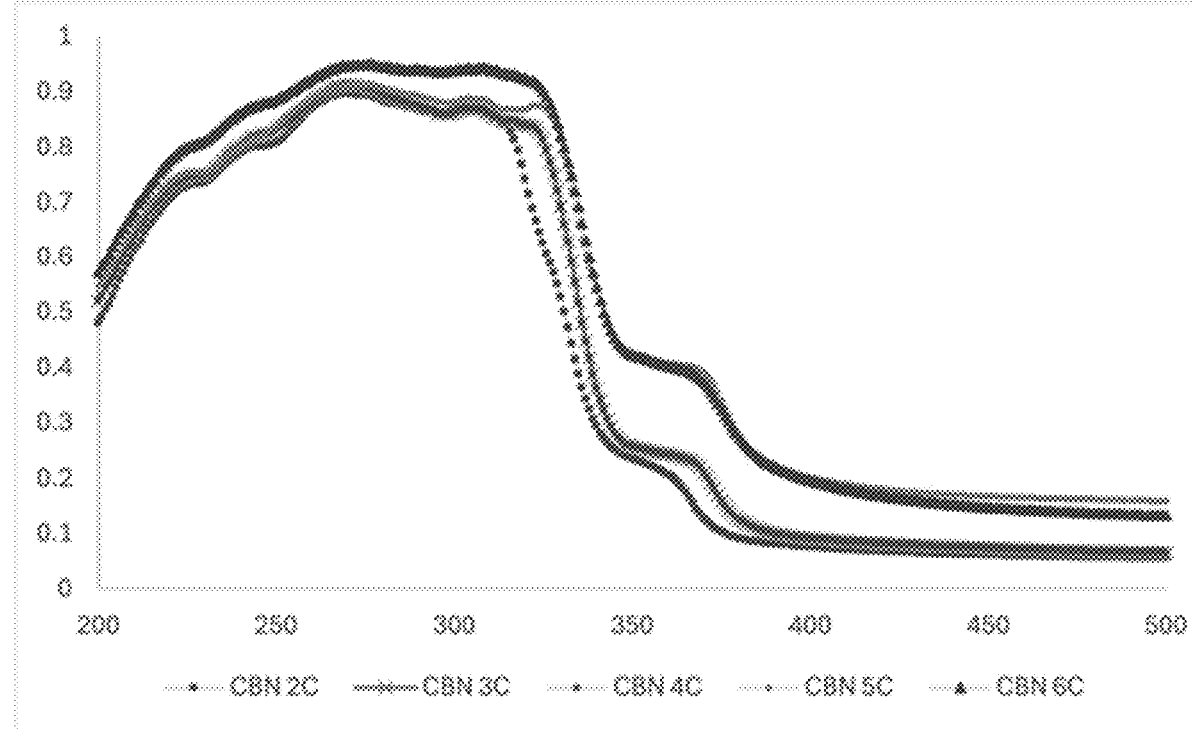
FIG. 10 Absorption spectra of different CBN ether dimers having linkers of varying carbon chain length.

It has been found that the structure of the fluorescent moiety plays an important role in the overall electronics of the resulting compound. The linker in the DiCannabinolalkyleneether dimers can be varied to different lengths and this change in length has been found to affect the overall morphology and the chain stacking of the molecules. A change in number of carbon atoms in the linker with respect to the fluorescence was observed. Absorption and fluorescence spectroscopy was used to evaluate this change with the different dimers and the results are provided in FIGS. 9-10. FIG. 9 is a stacked graph of fluorescence spectroscopy for the odd and even series of dimers of Example 12 (x-axis wavelength in nanometers; y-axis intensity) and FIG. 10 is a stacked graph of the absorption spectroscopy for the same dimers (x-axis wavelength in nanometers; y-axis intensity). While the absorption spectra (FIG. 10) showed minimal differences between the dimers of different linker lengths, the fluorescence spectra (FIG. 9) revealed a significant and unexpected pattern. By changing the number of carbons in linkers, it was observed that when the number of carbon spacer is odd (3C and 5C) the fluorescence is higher compared to the even (2C, 4C and 6C), and a distinct hump at higher wavelengths is observed for odd numbered linkers. This change in the spectra with changing the number of carbons is termed here as the "odd-even effect". This effect indicated that the odd-numbered spacers enhanced fluorescence more than the even-numbered spacers.

It has been shown that the tunability of the fluorescence by changing spacing unit to yield completely different fluorescence spectrum and color emission, a result that was unanticipated. Chain length of the spacing unit and changes in the functionality of the connection from ester to ether result in fluorescence changes as evidenced by changes in excitation and emission spectra. The ether functionality preserves the electronic structure of the CBN molecule. The structural variety in spacer length and functionality of the connection allows for the ability to tune and adjust the fluorescent behavior of the resulting cannabinoid dimer to meet a variety of needs and applications.

Example 14: DiCannabinolalkyleneether Dimer Analogs with Increased Hydrophilicity To improve hydrophilicity, and therefore aqueous solubility, of the DiCannabinolalkyleneether dimers of Example 12, the dimers can be functionalized with various groups such as hydroxyl, carboxyl, amino, sulfonic, phosphate, and quaternary ammonium groups. Dimers of Example 12 were sulfonated using chlorosulfonic acid, resulting in sulfonated cannabinol ether dimers as yellow solids. The effects of this modification on both even and odd carbon-chain-length dimers were explored. Fluorescence analysis was conducted on sulfonated CBN (2C) ether dimer as a representative from the even series and on sulfonated CBN (3C) ether dimer as a representative from the odd series.

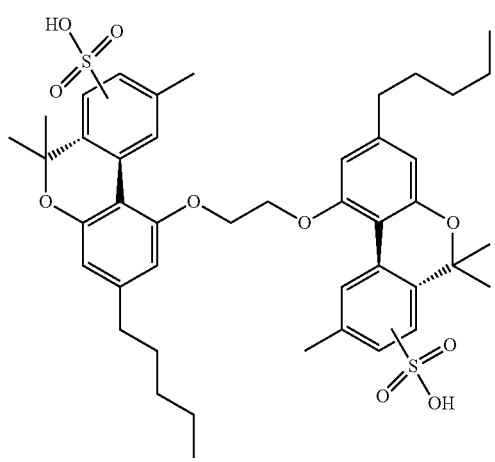

Sulfonated CBN(2C) ether dimer

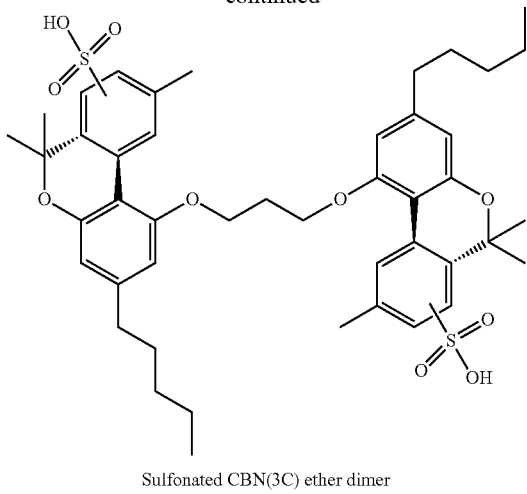

Sulfonated CBN(3C) ether dimer

Figure 11A:
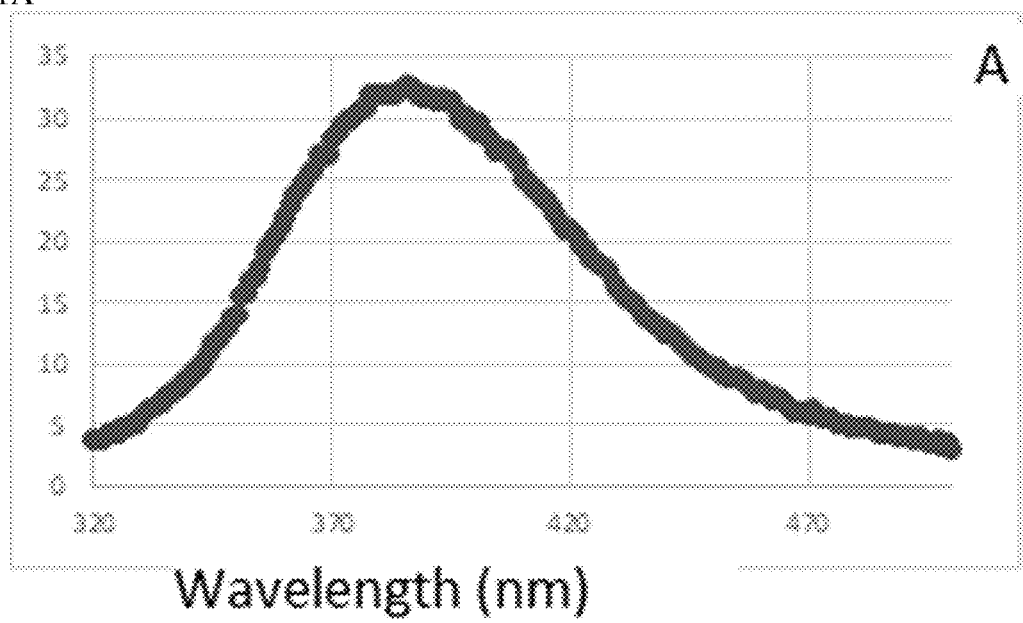
FIGS. 11A and 11B: Fluorescence analysis of sulfonated CBN ether dimer having a 3-carbon spacer (FIG. 11B) compared to a sulfonated CBN ether dimer having a 2-carbon spacer (FIG. 11A)
Figure 11B:
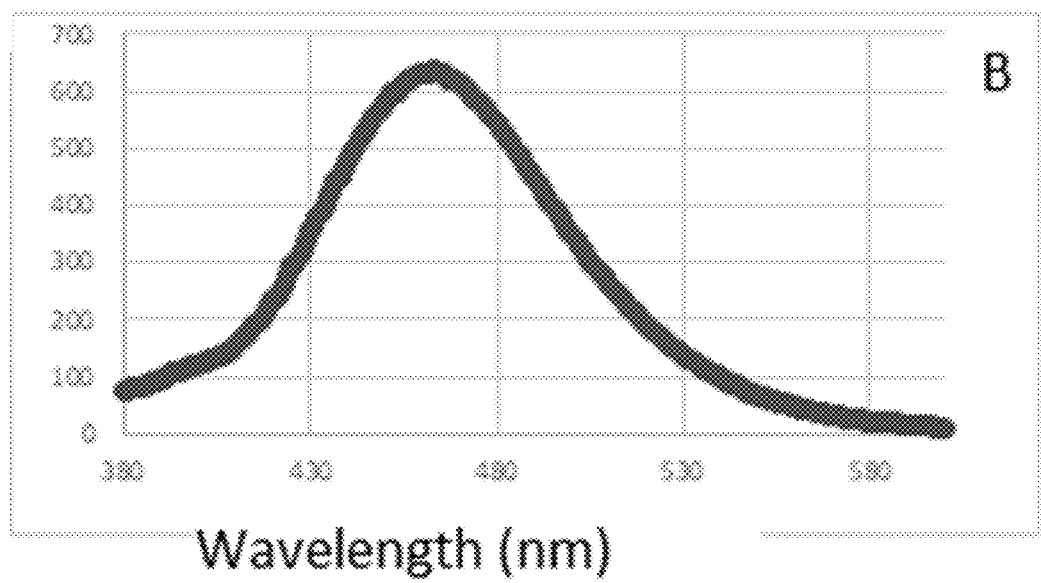

Fluorescence analysis revealed a remarkable 20-fold increase in fluorescence intensity for sulfonated dimers with a 3-carbon spacer (FIG. 11B) compared to those with a 2-carbon spacer (FIG. 11A). This dramatic enhancement underscores the superior fluorescence properties of odd-carbon-chain-length dimers, highlighting their potential for various applications.

Example 15: Quantum Yield Calculations

Quantum yield (QY) is an important parameter in assessing the efficiency of fluorescence in compounds. It is defined as the ratio of the number of photons emitted to the number of photons absorbed by a fluorescent substance. High quantum yield indicates strong fluorescence, which is desirable in applications like fabric brightening.

The quantum yields of the two sulfonated CBN dimers of Example 14 were calculated using a standard method. The QY was determined by comparing the fluorescence intensity of the dimers to that of a blank. For fabric brightening applications, a high quantum yield is typically considered desirable to ensure strong and effective fluorescence that is >50%. The result of both the dimers was about 20% (sulfonated CBN (2C) ether dimer QY=21.29%; sulfonated CBN (3C) ether dimer 19.67%), which is considered a moderate quantum yield. The results showed that the quantum yields of the Sulfonated CBN (3C) and CBN (2C) ether dimers are ~30% of distilbene which has been calculated with the same standard and found to have QY=58.86%. Distilbene is a commercially available optical brightener commonly used in detergents. Despite having a lower quantum yield, the higher fluorescence intensity of the Sulfonated Cannabinol 3C than Sulfonated Cannabinol 2C ether dimer made it more suitable for fabric testing. In cases where moderate QY brighteners are used, they are used in higher amounts to ensure efficient fluorescence intensity. A unique characteristic of the CBN dimers is their natural source and less toxicity, where a higher amount will not negatively impact the application.

Overall, the quantum yield calculations demonstrate that the sulfonated CBN ether dimers have competitive fluorescence properties, while their lower toxicity profiles offer a distinct advantage over current conventional optical brighteners presently being used in detergent and consumer product applications.

Example 16: Sulfonated CBN (3C) Ether Dimer as an Optical Brightener in Fabrics

Fabric testing with the Sulfonated CBN (3C) ether dimer of Example 14 was conducted using two methods to explore its use as an optical brightener in fabric care. Although its quantum yield is slightly lower compared to the Sulfonated CBN (2C) ether dimer, the higher fluorescence intensity of the Sulfonated CBN (3C) ether dimer made it a more suitable candidate for the studies.

Figure 12:
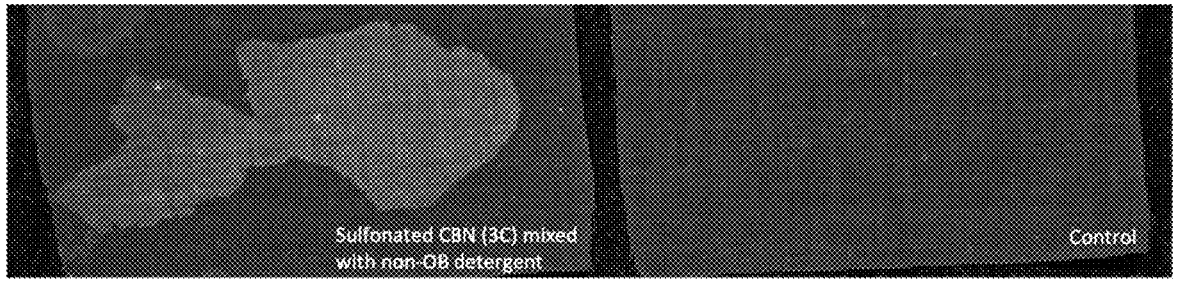
FIG. 12 Images of fabric samples under UV light after treatment with detergent containing a sulfonated CBN ether dimer compared to an untreated fabric sample (Control)

Method 1: Direct Dripping Test: The Sulfonated CBN (3C) ether dimer was dissolved in a detergent free of optical brighteners ("non-OB detergent") at a 0.01 weight % concentration. After stirring, the solution mixture was dripped directly onto fabric samples using a pipette. The treated fabric and an untreated fabric sample (Control) were observed under black light (UV). Under black light, the treated fabric exhibited fluorescence where the mixture was applied compared to the Control fabric which did not exhibit any fluorescence (FIG. 12), indicating the successful application of the dimer.

Figure 13:
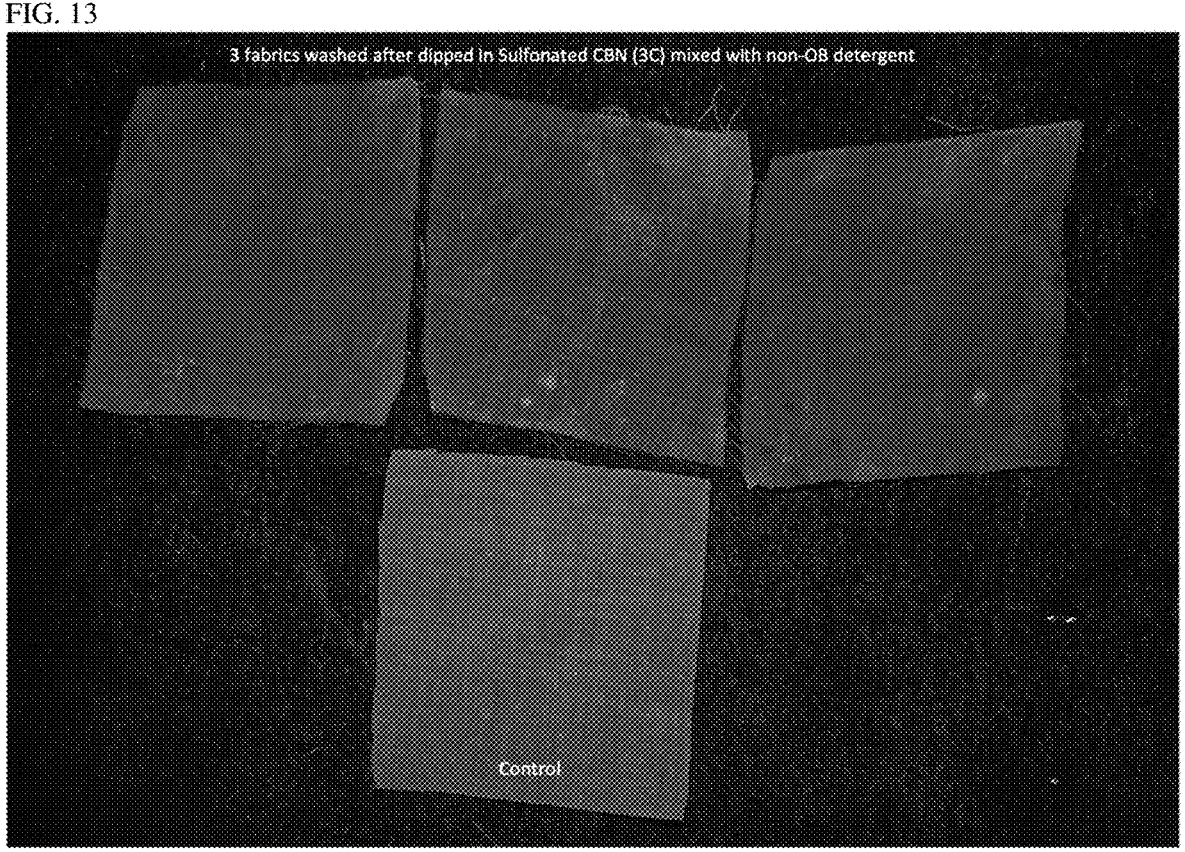
FIG. 13 Images of fabric samples under UV light after washing with detergent containing a sulfonated CBN ether dimer compared to an untreated fabric sample (Control).

Method 2: Fabric Washing Test: In this method, 10 ml of the 0.01% non-OB detergent solution containing the Sulfonated CBN (3C) ether dimer was mixed with 600 ml of water. Three fabrics were washed and dried using this solution to simulate conditions in a washing machine. When observed under UV light, the fabric samples showed a distinct patchiness pattern of fluorescence compared to the Control (FIG. 13), revealing the dimer adhesion to the fabric and its function as an optical brightener. Increasing the concentration of dimer in the detergent composition is expected to produce enhanced fluorescence of fabrics washed with the detergent as a higher concentration of dimer will adhere to the fabric.

Example 17: Synthesis of CBN-Aniline

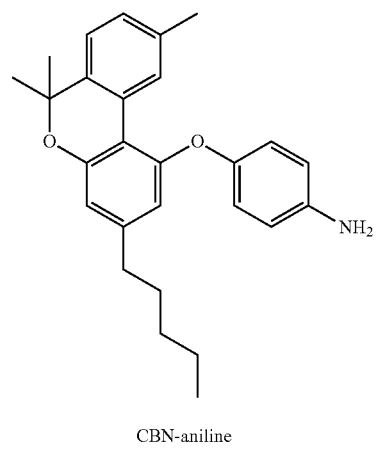 [SMILES: CCCCCc1cc(Oc2ccc(N)cc2)c2c(c1)OC(C)(C)c1ccc(C)cc1-2]

CBN-aniline

The synthesis of CBN-aniline was conducted via C—O bond using copper catalyst. The product was characterized by $^1$H NMR. CBN-aniline exhibited fluorescent properties. The CBN-aniline can be formed into dimers by linking through the aniline amine.

Example 18: Synthesis of Asymmetric Dimers

Asymmetric Dimer containing both a CBN moiety and a D8-THC moiety was prepared and characterized by $^1$H NMR.

As used herein, "alkyl" includes straight chain, branched, and cyclic saturated aliphatic hydrocarbon groups, having the specified number of carbon atoms, generally from 1 to about 20 carbon atoms, greater than 3 for the cyclic. Alkyl groups described herein typically have from 1 to about 20, specifically 3 to about 18, and more specifically about 6 to about 12 carbons atoms. Examples of alkyl include, but are not limited to, methyl, ethyl, n-propyl, isopropyl, n-butyl, 3-methylbutyl, t-butyl, n-pentyl, and sec-pentyl. As used herein, "cycloalkyl" indicates a monocyclic or multicyclic saturated or unsaturated hydrocarbon ring group, having the specified number of carbon atoms, usually from 3 to about 10 ring carbon atoms. Monocyclic cycloalkyl groups typically have from 3 to about 8 carbon ring atoms or from 3 to about 7 carbon ring atoms. Multicyclic cycloalkyl groups may have 2 or 3 fused cycloalkyl rings or contain bridged or caged cycloalkyl groups. Examples of cycloalkyl groups include cyclopropyl, cyclobutyl, cyclopentyl, or cyclohexyl as well as bridged or caged saturated ring groups such as norbornane or adamantane.

The term "heterocycloalkyl" is used to indicate saturated cyclic groups containing from 1 to about 3 heteroatoms chosen from N, O, and S, with remaining ring atoms being carbon. Heterocycloalkyl groups have from 3 to about 8 ring atoms, and more typically have from 5 to 7 ring atoms. A $C_2$-$C_7$heterocycloalkyl group contains from 2 to about 7 carbon ring atoms and at least one ring atom chosen from N, O, and S. Examples of heterocycloalkyl groups include morpholinyl, piperazinyl, piperidinyl, and pyrrolidinyl groups.

As used herein, "heteroaryl" indicates a stable 5- to 7-membered monocyclic or 7 to 10-membered bicyclic heterocyclic ring which contains at least 1 aromatic ring that contains from 1 to 4, or specifically from 1 to 3, heteroatoms chosen from N, O, and S, with remaining ring atoms being carbon. When the total number of S and O atoms in the heteroaryl group exceeds 1, these heteroatoms are not adjacent to one another. In a specific embodiment, the total number of S and O atoms in the heteroaryl group is not more than 2. Examples of heteroaryl groups include, but are not limited to, pyridyl, indolyl, pyrimidinyl, pyridizinyl, pyrazinyl, imidazolyl, oxazolyl, furanyl, thiophenyl, thiazolyl, triazolyl, tetrazolyl, isoxazolyl, quinolinyl, pyrrolyl, pyrazolyl, and 5,6,7,8-tetrahydroisoquinoline.

The structures drawn herein, including Formula (I) and (II) include all subformulae thereof. In certain situations, the compounds of Formula (I) and (II) may contain one or more asymmetric elements such as stereogenic centers, stereogenic axes and the like, e.g. asymmetric carbon atoms, so that the compounds can exist in different stereoisomeric forms. These compounds can be, for example, racemates or optically active forms. For compounds with two or more asymmetric elements, these compounds can additionally be mixtures of diastereomers. For compounds having asymmetric centers, it should be understood that all of the optical isomers and mixtures thereof are encompassed. In these situations, single enantiomers, i.e., optically active forms, can be obtained by asymmetric synthesis, synthesis from optically pure precursors, or by resolution of the racemates.

Certain compounds described may be prepared as a salt. Examples of suitable salts include, but are not limited to, mineral or organic acid salts of basic residues such as amines; alkali or organic salts of acidic residues such as carboxylic acids; and the like. In some embodiments, the salts include the conventional non-toxic salts and the quaternary ammonium salts of the parent compound formed, for example, from non-toxic inorganic or organic acids. For example, conventional non-toxic acid salts include those derived from inorganic acids such as hydrochloric, hydrobromic, sulfuric, sulfamic, phosphoric, nitric and the like; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, mesylic, esylic, besylic, sulfanilic, 2-acetoxybenzoic, fumaric, toluenesulfonic, methanesulfonic, ethane disulfonic, oxalic, isethionic, HOOC—$(CH_2)_q$-COOH where q is 0-4, and the like.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Various other components may be included and called upon for providing for aspects of the teachings herein. For example, additional materials, combinations of materials and/or omission of materials may be used to provide for added embodiments that are within the scope of the teachings herein. Adequacy of any particular element for practice of the teachings herein is to be judged from the perspective of a designer, manufacturer, seller, user, system operator or other similarly interested party, and such limitations are to be perceived according to the standards of the interested party.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein. No functional language used in claims appended herein is to be construed as invoking 35 U.S.C. § 112 (f) interpretations as "means-plus-function" language unless specifically expressed as such by use of the words "means for" or "steps for" within the respective claim.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. The term "exemplary" is not intended to be construed as a superlative example but merely one of many possible examples.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like.

As used herein, the term "substantially" means to a great or significant extent, but not completely.

The term "comprising", "comprises", "having", "including", and "containing" are to be construed as open-ended terms (i.e., meaning "including, but not limited to") unless otherwise noted.

As used herein, "optional" or "optionally" means that the subsequently described event or circumstance may or may not occur, and that the description includes instances where said event or circumstance occurs and instances where it does not.

The invention claimed is:

1. A compound having the structure:

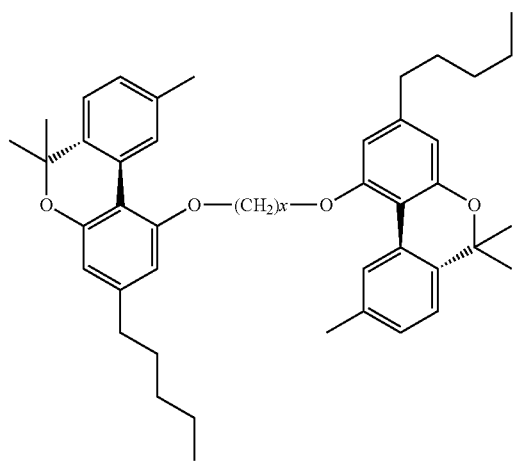

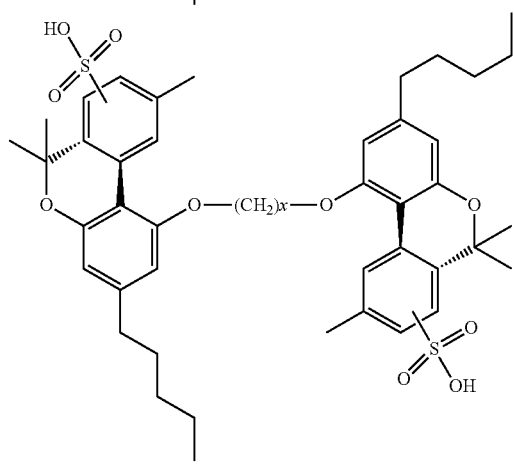

-continued

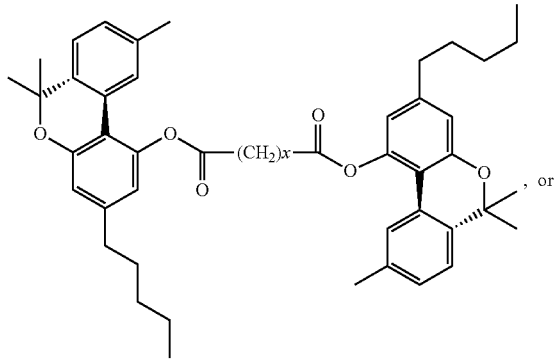

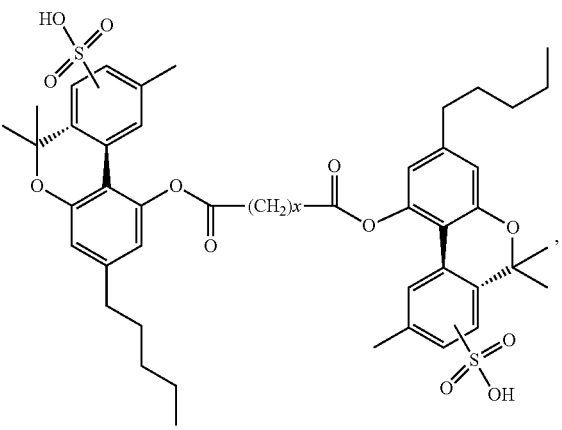

wherein x is 1, 2, 3, 4, 5, 6, 7, 8, 9, or 10.

2. A fabric care composition comprising a compound having the structure:

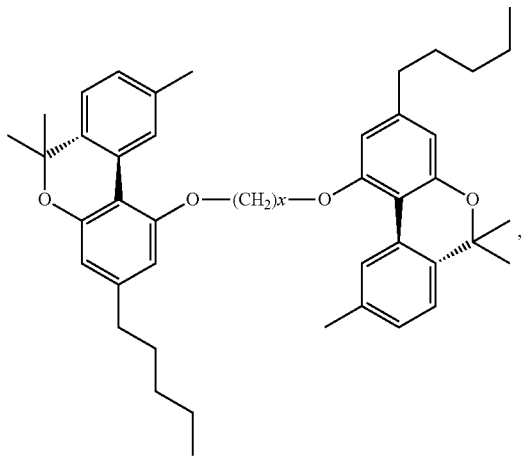

-continued

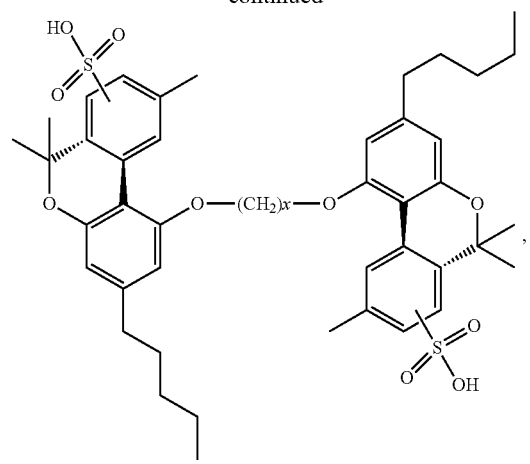

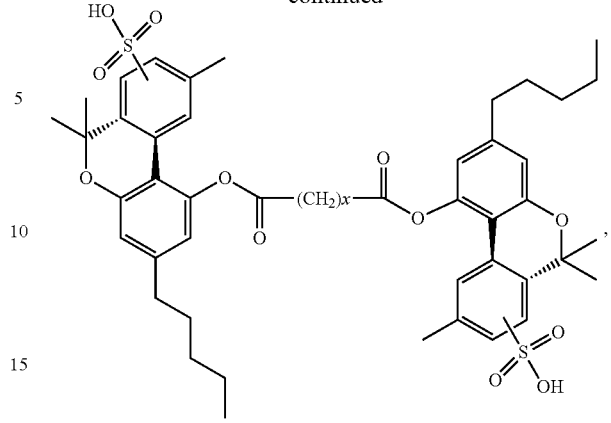

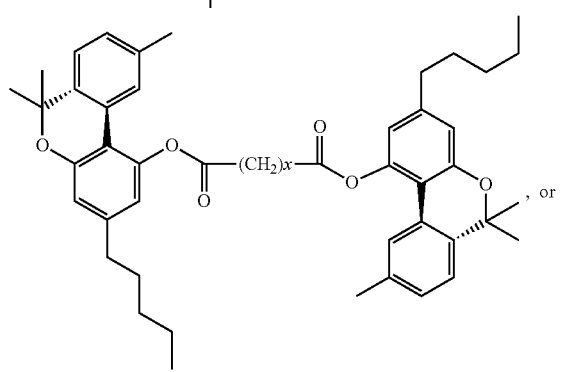

wherein x is 1, 2, 3, 4, 5, 6, 7, 8, 9, or 10;
wherein the fabric care composition is a detergent, a soap, or a fabric softener.

3. The fabric care composition of claim 2, wherein the compound is present in an amount of about 0.001 to about 0.1 wt % based on the total weight of the composition.

4. The fabric care composition of claim 2, wherein the compound is a fabric care optical brightener.

5. A composition comprising the compound of claim 1.

6. The composition of claim 5, wherein the composition is an adhesive, a cosmetic, or a paint.

7. The composition of claim 5, wherein the composition is a pharmaceutical, a pharmaceutical imaging agent, or a biomedical imaging agent.

* * * * *